(12) United States Patent
Caruso (10) Patent No.: US 11,803,356 B1
(45) Date of Patent: *Oct. 31, 2023

(54) SOFTWARE REQUIREMENTS CREATING AND TRACKING SYSTEM AND METHOD

(71) Applicant: Nationwide Mutual Insurance Company, Columbus, OH (US)

(72) Inventor: Benjamin Bergin Caruso, Dublin, OH (US)

(73) Assignee: Nationwide Mutual Insurance Company, Columbus, OH (US)

( * ) Notice: Subject to any disclaimer, the term of this patent is extended or adjusted under 35 U.S.C. 154(b) by 400 days.

This patent is subject to a terminal disclaimer.

(21) Appl. No.: 17/101,675

(22) Filed: Nov. 23, 2020

Related U.S. Application Data (63) Continuation of application No. 16/672,856, filed on Nov. 4, 2019, now Pat. No. 10,846,064, which is a continuation of application No. 15/610,850, filed on Jun. 1, 2017, now Pat. No. 10,466,979.

(51) Int. Cl.
| | |
|---|---|
| *G06F 8/34* | (2018.01) |
| *G06F 8/33* | (2018.01) |
| *G06F 8/36* | (2018.01) |
| *G06F 8/35* | (2018.01) |

(52) U.S. Cl.
CPC ............. *G06F 8/34* (2013.01); *G06F 8/33* (2013.01); *G06F 8/35* (2013.01); *G06F 8/36* (2013.01)

(58) Field of Classification Search
CPC ..... G06F 8/34; G06F 8/33; G06F 8/35; G06F 8/36
See application file for complete search history.

(56) References Cited

U.S. PATENT DOCUMENTS

| | | | | |
|---|---|---|---|---|
| 5,159,687 | A * | 10/1992 | Richburg | G06F 8/36 706/45 |
| 7,437,304 | B2 * | 10/2008 | Barnard | G06Q 10/06312 705/7.17 |
| 7,761,591 | B2 * | 7/2010 | Graham | G06Q 40/02 709/227 |
| 7,987,461 | B2 * | 7/2011 | Agrawal | G06F 9/5044 717/177 |
| 8,046,771 | B2 * | 10/2011 | Chancey | G06F 9/54 719/310 |

(Continued)

*Primary Examiner* — Lewis A Bullock, Jr.
*Assistant Examiner* — Theodore E Hebert
(74) *Attorney, Agent, or Firm* — Morgan, Lewis & Bockius LLP (57) ABSTRACT

A system and method for creating and tracking software requirements associated with a product offering. An electronic template is employed in connection with the system and method. The electronic template is configured to be associated with a product type, where the product type is associated with a plurality of software requirements. The electronic template comprises a plurality of fields where the fields comprise software requirement type fields. Each software requirement type field is associated with a software requirement content field. The electronic template is configured to receive data in the software requirement type fields and the software requirement content fields. A database is employed and configured to store the data received in the software requirement type fields and the software requirement content fields in accordance with the configuration of the template.

13 Claims, 11 Drawing Sheets

(56) References Cited

U.S. PATENT DOCUMENTS

| | | | | |
|---|---|---|---|---|
| 8,365,138 | B2* | 1/2013 | Iborra | G06F 16/2365 717/113 |
| 2005/0155006 | A1* | 7/2005 | Subasic | G06F 30/392 716/122 |
| 2005/0204338 | A1* | 9/2005 | Davis | G06F 8/36 717/121 |
| 2007/0294668 | A1* | 12/2007 | Mohindra | G06F 8/61 717/120 |
| 2008/0065634 | A1* | 3/2008 | Krinsky | G06F 16/9535 707/999.102 |
| 2008/0178147 | A1* | 7/2008 | Meliksetian | G06F 8/36 717/107 |
| 2008/0263505 | A1* | 10/2008 | StClair | G06F 8/10 717/106 |
| 2010/0088497 | A1* | 4/2010 | Bunin | G07F 17/323 713/1 |
| 2010/0095269 | A1* | 4/2010 | Bouillet | G06F 8/10 717/104 |
| 2012/0123729 | A1* | 5/2012 | Chang | G06F 8/51 702/127 |
| 2015/0180736 | A1* | 6/2015 | Leung | H04L 41/5054 709/226 |
| 2015/0347096 | A1* | 12/2015 | Hanna | G06F 8/36 717/107 |
| 2016/0055079 | A1* | 2/2016 | Hanna | G06F 11/3684 717/135 |
| 2017/0206066 | A1* | 7/2017 | Fischer | G06F 8/60 |
| 2018/0157384 | A1* | 6/2018 | Baneva | G06F 9/5077 |

* cited by examiner

Nationwide VUL Accumulator

- Overview
- Riders
- Attachments / Comments
- Status
- Requirements Browser
  - Premium Provisions
  - Death Benefit Provisions
  - 7702/7702A
  - Monthly Deductions
  - Other Policy Charges
  - Policy Loans Tasks LAD Feed
Need to meet with Actuarial Financial Reporting and Valuation review product specifications for any changes needed to the LAD feed.
audit    Low    In Progress Product Name
As part of the Finalize scope, IT will revisit some setup items that we promoted as part of setup with a Low confidence rating for Stability.
New

+ Add a Category

▲ Add Existing Category to Product

Secondary Policy Continuation Guarantee ○ Secondary Policy Continuation Guarantee, including Shadow Account details + Add a New Category Category Name | Category Name Short description (max 256 chars)

Close

+ Submit

Legal Product Name http://

Requirement Content

The legal product name is Individual Flexible Premium Adjustable Fixed and Index-Linked Universal Life Insurance Policy, Non-Participating.

Other Product Information

The following products have this requirement:

- Nationwide YourLife No-Lapse Guarantee UL
- Nationwide VUL Accumulator
- Nationwide VUL Protector
- 2017 Nationwide YourLife No-Lapse Guarantee UL
- Nationwide YourLife Indexed UL Accumulator
- Nationwide YourLife Indexed UL Protector

Open Tasks

No Open Tasks

Linked Requirements

Comments

Attachments

SOFTWARE REQUIREMENTS CREATING AND TRACKING SYSTEM AND METHOD

CROSS REFERENCE TO RELATED APPLICATIONS

This application is a continuation of U.S. patent application Ser. No. 16/672,856 filed Nov. 4, 2019, which is a continuation of U.S. patent application Ser. No. 15/610,850 filed on Jun. 1, 2017, now U.S. Pat. No. 10,466,979, the entirety of which is hereby incorporated by reference.

FIELD OF THE INVENTION

The invention relates to improved methods and systems for creating and tracking software requirements associated with a product offering.

BRIEF SUMMARY OF THE INVENTION

The invention is directed to a system and method for creating and tracking software requirements associated with a product offering. An electronic template is employed in connection with the system and method. The electronic template is configured to be associated with a product type, where the product type is associated with a plurality of software requirements. The electronic template comprises a plurality of fields, where the plurality of fields comprise software requirement type fields. Each software requirement type field is associated with a software requirement content field. The electronic template is configured to receive data in the software requirement type fields and the software requirement content fields. A database is employed and configured to store the data received in the software requirement type fields and the software requirement content fields in accordance with the configuration of the template.

In some embodiments, a comparison module is configured to compare the software requirement content field of one electronic template with the corresponding software requirement content field of one other electronic template. The one electronic temple and the other electronic template arc both associated with a same product type.

In some embodiments, at least some of the plurality of software requirements are grouped by category.

In some embodiments, the electronic template is associated with a first product and is created by copying an electronic template associated with a second product that is a same product type as the first product.

In some embodiments, both the software requirement fields and the software requirement content fields of the second product are copied and, in other embodiments, only the software requirement fields of the second product are copied.

BRIEF DESCRIPTION OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

In the drawings:

FIGS. 2A through 2H are exemplary user interfaces illustrating functionality associated with the present invention;

DETAILED DESCRIPTION OF THE EXEMPLARY EMBODIMENTS

The present invention involves a computer system that allows for the creation and tracking of the requirements that used to build software implementations of various products. The invention is particularly useful in connection with non-tangible product offerings. More particularly, the system allows for creation and tracking of the requirements for software that is needed to implement, administer and/or support a product using a computer system. The requirements are organized by a naming convention, by way of a template, and tracked and housed separately from the products in which the requirements are used, as described more fully herein.

In connection with embodiments of the invention, software requirements for products are created, organized and maintained by line of business using template technology. This facilitates future product builds within the line of business because requirements, once created, can be reused for new products within the same line of business.

The examples described herein relate to insurance products (e.g., life insurance) that may be offered to consumers and implemented and administered via a computer system. However, the invention is not so limited and may be used and implemented in connection with software requirements that are required to offer, implement and support any type of product using a computer system.

In a specific example, the invention is applied to two universal life insurance products that include features that are similar and features that are different (e.g., the VUL Accumulator Product and the No-Lapse Guarantee UL Product). Each of these products is of the same type—i.e., a universal life insurance product. Each product is associated with requirements. Each requirement is associated with content. In this specific example, by way of illustration, both products include requirements relating to: the product name (i.e., External Product Name; Internal Product Name; Legal Product Name); the mortality table to be used in underwriting the product; the filing company and state availability (i.e., which filing to make in which states); the sales distribution for the product; the age basis to use for the product; the underwriting classes; limitations on policy issuance; how to calculate premiums; death benefit provisions; policy charges; commissions; and policy loans, by way of example.

Some of the requirements for the two products are identical (e.g., the type of filing to be made in New York), and some are different (e.g., both use mortality tables, but the mortality tables to be used are different). By way of further example, both products have a requirement regarding the initial policy continuation guarantee provision, but the formulas used to make the associated calculations are different.

Each of the products and their associated requirements and requirements content may he represented in a user interface by way of a template. The template may provide: a textual description of the product: a section describing other products that are related to the main product (e.g., a rider to an insurance contract, which may itself also be associated with a type, requirements, requirements content, and a template); a tasks section (e.g., list of all tasks that are underway for completing the software requirements for the product, and an associated status for the task); and a requirements browser, for identifying requirements used in other products that may be applicable to, a given product; and a section for each requirement, which identifies the requirement (allowing for stringent naming conventions if desired) and includes the content for the requirement.

The template may include percentages next to each requirement. These percentages represent the level of confidence of the end user creating the requirements that a given requirement is accurate and complete for the product.

Figure 1:
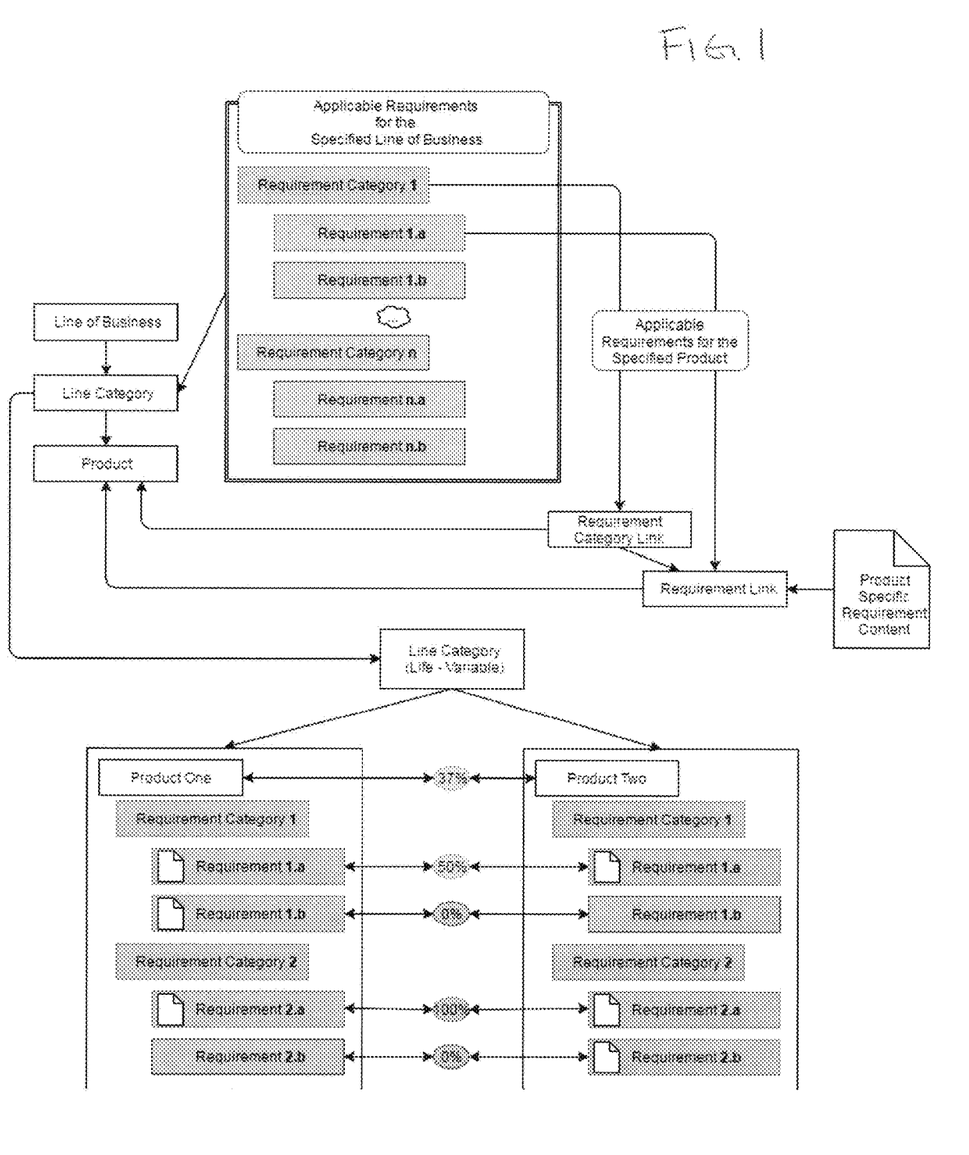
FIG. 1 is an exemplary data structure that may be used in connection with an exemplary embodiment of the present invention.

Data regarding the product type, the requirements and the contents of the requirements is entered and stored as data elements in a database. In the preferred embodiment, the database is a SQL database. FIG. 1 illustrates an exemplary data structure that may be used in connection with the present invention. As shown in FIG. 1, requirements for a line of business may be organized by category, with associated requirements for each category. Categories and requirements are linked to products. FIG. 1 also illustrates how products may be compared, and the similarities/differences between the products in terms of their categories/requirements can be displayed, as described in more detail herein.

Requirements may be grouped by category (i.e., a category may have one or more requirements). Like the requirements, categories are maintained and housed (i.e., in a database) separately from the products with which they are associated. By assigning a category to a new product, e.g., when building a new product, the requirements associated with that category will be included with the product. Like requirements, categories are linked across the products such that every product that is linked to a particular category can be identified.

Thus, in connection with a new-product build, the end user creates a product type (e.g., a line of business that includes products with similar traits, such as universal life products). The user then creates the first product build by creating categories and requirements, organizing them using the template structure, and filling in the content for each requirement. Categories and requirements created in this manner are then available for others to use when creating product requirements for the same product type. In embodiments in which equations may be included in requirement content (e.g., in the insurance context, in which equations are used for actuarial purposes), a standardized format that is capable of alteration and parsing may be used for creating the equations, such as LaTaX. The ability to author formulas in this way also allows for such formulas to be compared between requirement contents, as described more fully herein.

Using the data thus stored in the database, and employing aspects of the present invention, new product requirements can be built using requirements and/or categories from existing products by cloning requirements for existing products, in whole or in part. While the new product may have all or some of the same requirements or categories as the existing product, at least some of the content within those requirements will differ. Thus, in some embodiments, the end user has the option of cloning an existing product by taking the entirety of the requirements and the requirements content for the existing product, and changing it as appropriate to build the new product (i.e., by adding new requirements, deleting requirements, or changing the contents of the requirements), or by taking only the requirements of the existing product, without the contents. In this latter instance, the end user will create entirely new contents for the requirements. In the event an existing product is cloned to create a new product both in terms of its requirements and requirements content, the confidence level associated with the contents for the new product is set to 0%. As an end user revises the content for the new product, the confidence level associated with the requirements content will increase.

Changes to requirements in a template, and contents of the same, are tracked and versioning is maintained, in the preferred embodiment. This allows for an audit trail, and traceability of changes.

Embodiments of the present invention also allow for comparing product requirements. More particularly, data regarding the products, requirements and requirements content can be compared and used to identify commonalities and differences among and between various products, as described more fully herein.

More particularly, as described in more detail above, product requirements are templated for each individual line of business using categories and requirement labels. An end user can then pick and choose from the categories (or requirements) to build the Product. The categories and, requirement labels will be added to the product with the product specific content. When adding a requirement to Product A, Product B's content will not be altered. This allows for comparison of like requirements across products, as the line of business level.

The comparison tool of the present invention identifies to the end user how the content is different. Using this information highlighting the differences between requirements, the software developer can start with the code for the existing product, and simply modify the code to reflect the differences in the requirements for the two products identified using the tool of the present invention. Thus, if a developer desires to build a new product by using the code from an existing product, he can start with the code associated with a product whose content requirements are very similar to the requirements of the product to be built, and focus carefully on the requirements that are different when coding. In the exemplary embodiment, percentages are listed next to the requirements being compared and will provide the information that facilitates the developer in making this determination.

Thus, embodiments of the present invention allow for comparing two or more products to each other and quickly identifying the differences between them. The requirements required for a product, including the content that comprises the requirement, are isolated for each product. Those requirements are then linked to all of the products that require them, resulting in a many-to-many relationship (except in the instance in which a product has only one requirement and/or a requirement is only used in a single product). The requirements exist independently of the products to which they belong.

Embodiments of the invention provide a number of advantages. For example, the invention works to increase the speed with which products can be brought to market. By, abstracting requirements out of the product domain, the key metadata of a given product may be identified and, if a new product offering is to include the same requirement, it can be automatically aligned with the requirement in the previously offered product. Also, by organizing requirements for a product using templates, and linking all requirements for all products at a level above the product level, product visibility is increased. By linking the content of a requirement to the product, but, keeping the actual requirement isolated by storing it in a database, products may be viewed at a lower-level, which provides more meaningful information to code developers. Still further, using the methods of the present invention, an organization can look at its portfolio of products as a whole (e.g., by understanding bow products share requirements and the differences between them), thereby allowing the organization to understand any shortcomings in its portfolio holistically (e.g., if a requirement is found to have a defect, the impact of that defect on the organization's entire product portfolio can be understood). The system also allows for isolating which product requirements are similar and providing a point of comparison between/among products.

Statistics regarding similarities and differences among products may be generated and used for analytical purposes. For example, the present invention allows an organization to understand which requirements belong to which products, as well as how similar a particular requirement for one product is to that same requirement for another product.

FIGS. 2A through 2H are exemplary user interfaces that may be used in connection with aspects of the present invention.

Figure 2A:
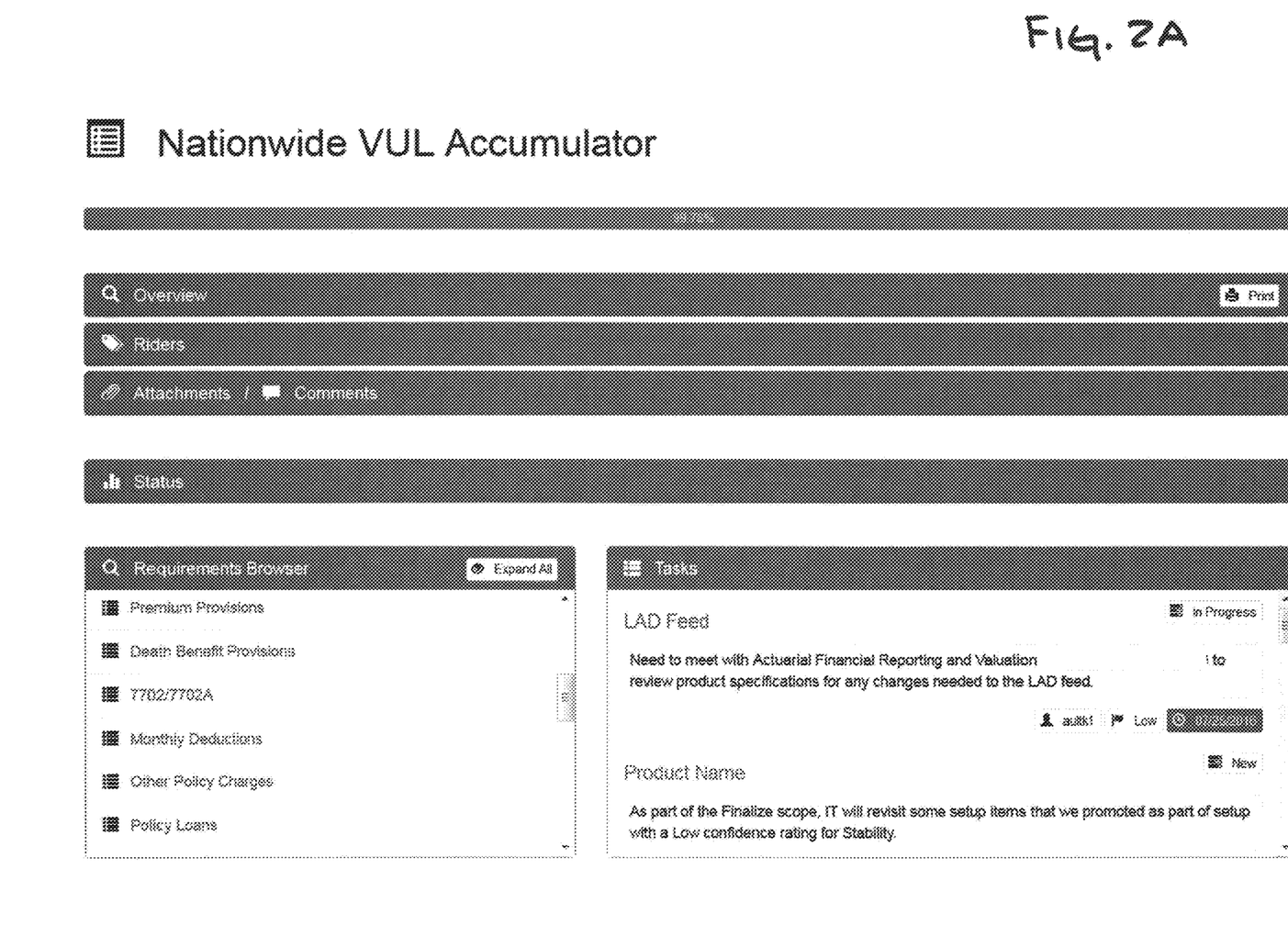

FIG. 2A is an exemplary user interface that may be used to navigate the building of a new product. It allows the end user to include an overview of the product; indicate any riders that are applicable; attach relevant documents or make comments; indicate the status of the product requirement build process; browse existing requirements for other products in the same line of business to see if applicable; and track tasks relating to the product requirement build process.

Figure 2B:
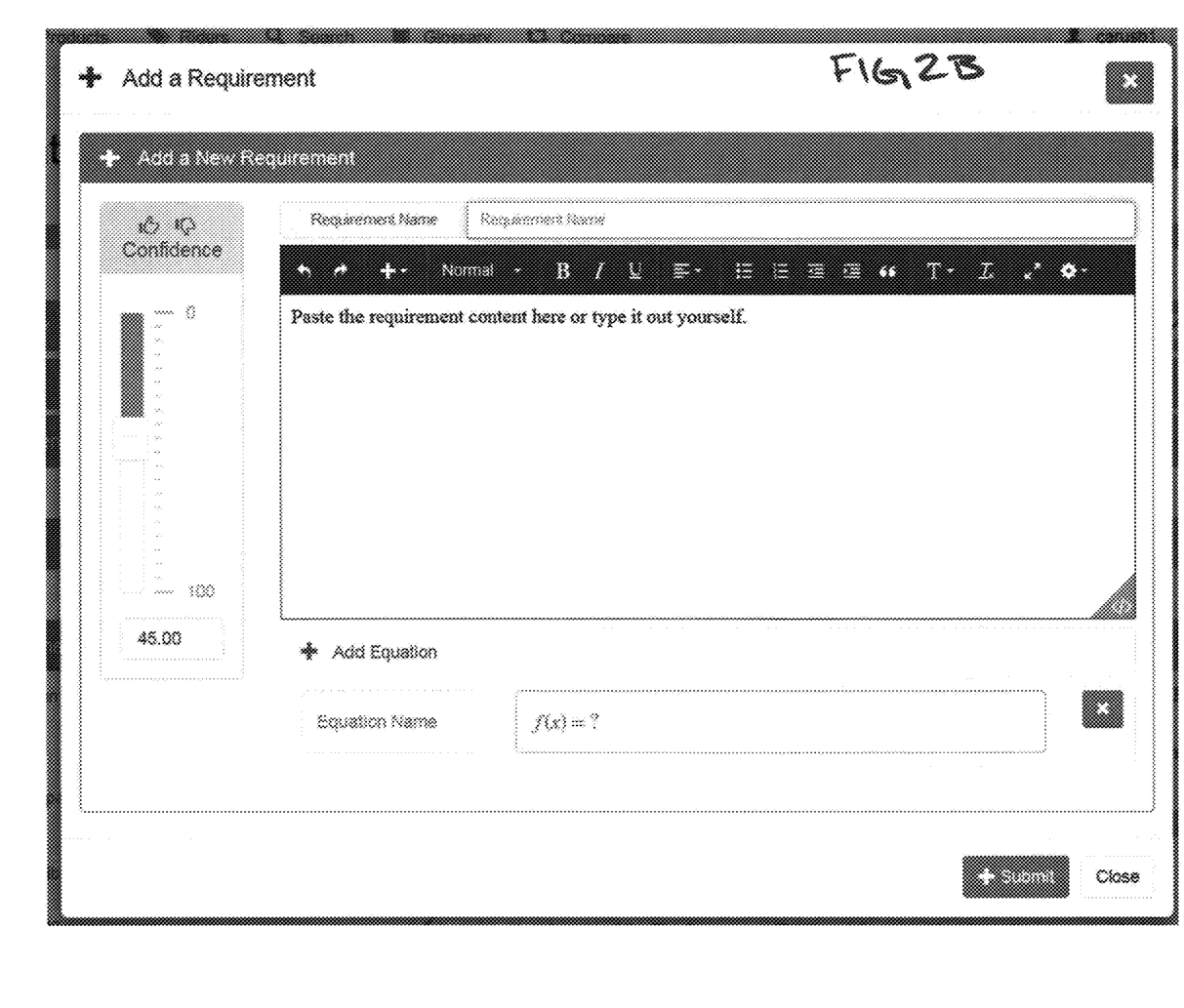

FIG. 2B is an exemplary user interface that allows an end user to create a requirement, indicating the requirement name, the contents of the requirement, and set a confidence level associated with the requirement (e.g., based on how complete or accurate the end user believes the requirement to be).

Figure 2C:
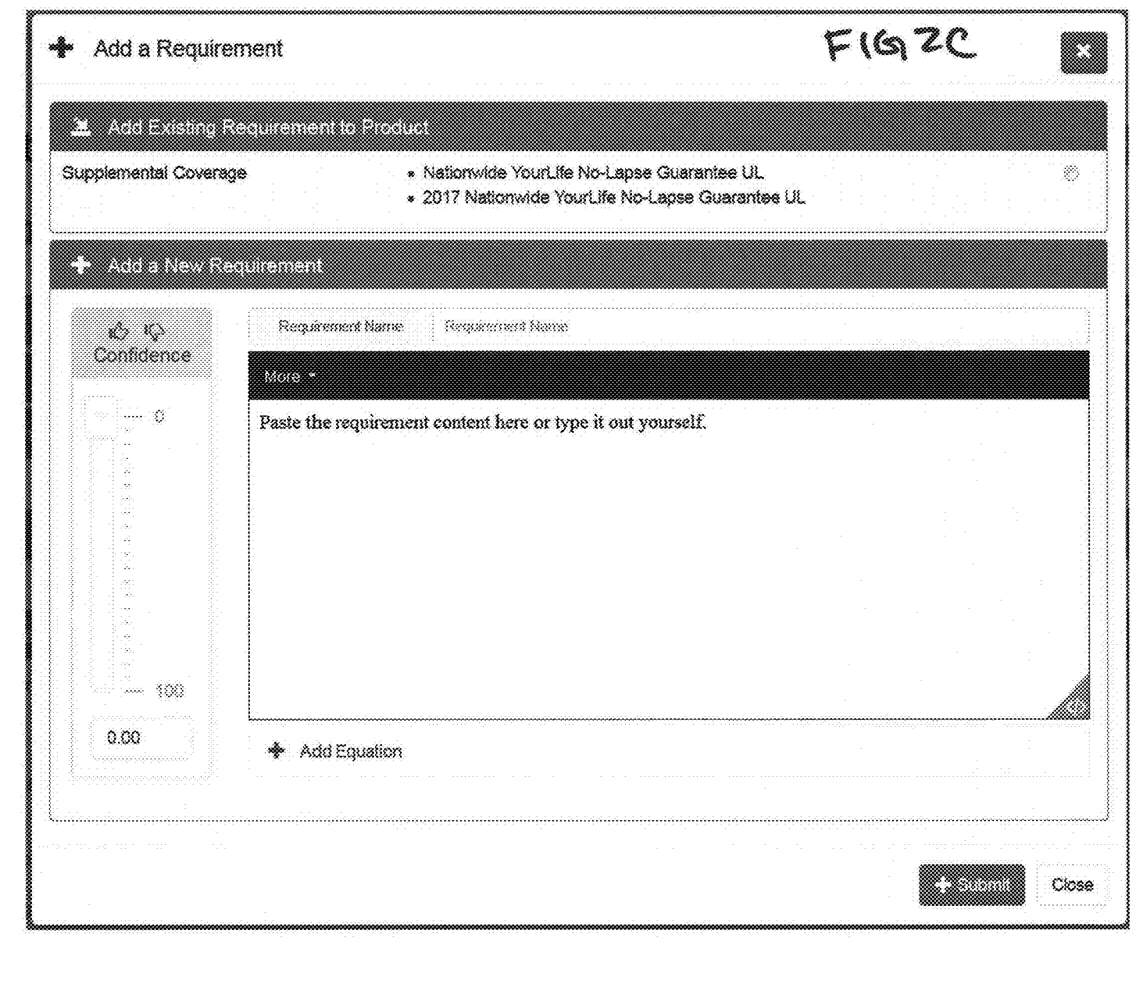

FIG. 2C is an exemplary user interface that allows an end user to add a requirement to a product build by using an existing requirement from another product within the same line of business. The end user can make edits to the requirement to conform it to the product being built. As shown, the confidence level for a requirement copied from an existing product is 0% until the end user edits it accordingly and increases the confidence level.

Figure 2D:
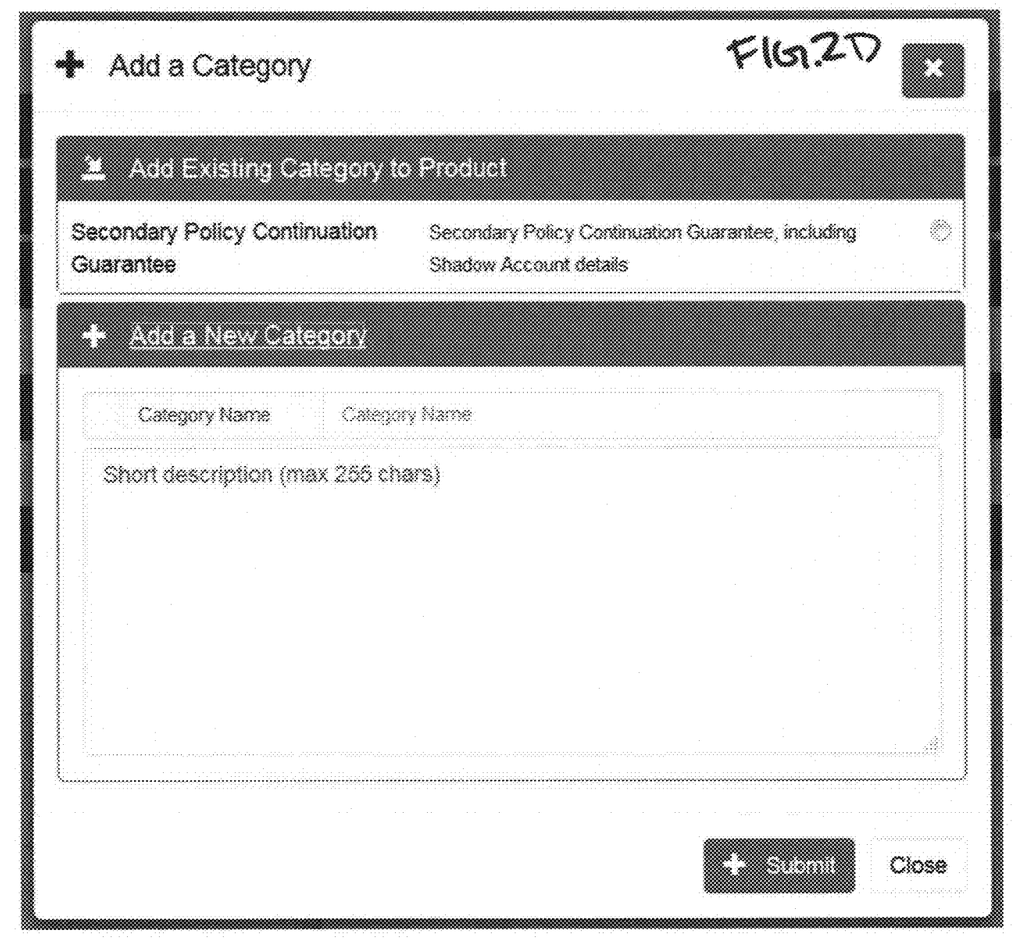

FIG. 2D is an exemplary user interface that allows an end user to add a category to a product. In this case, all requirements associated with the category will be added.

Figure 2E:
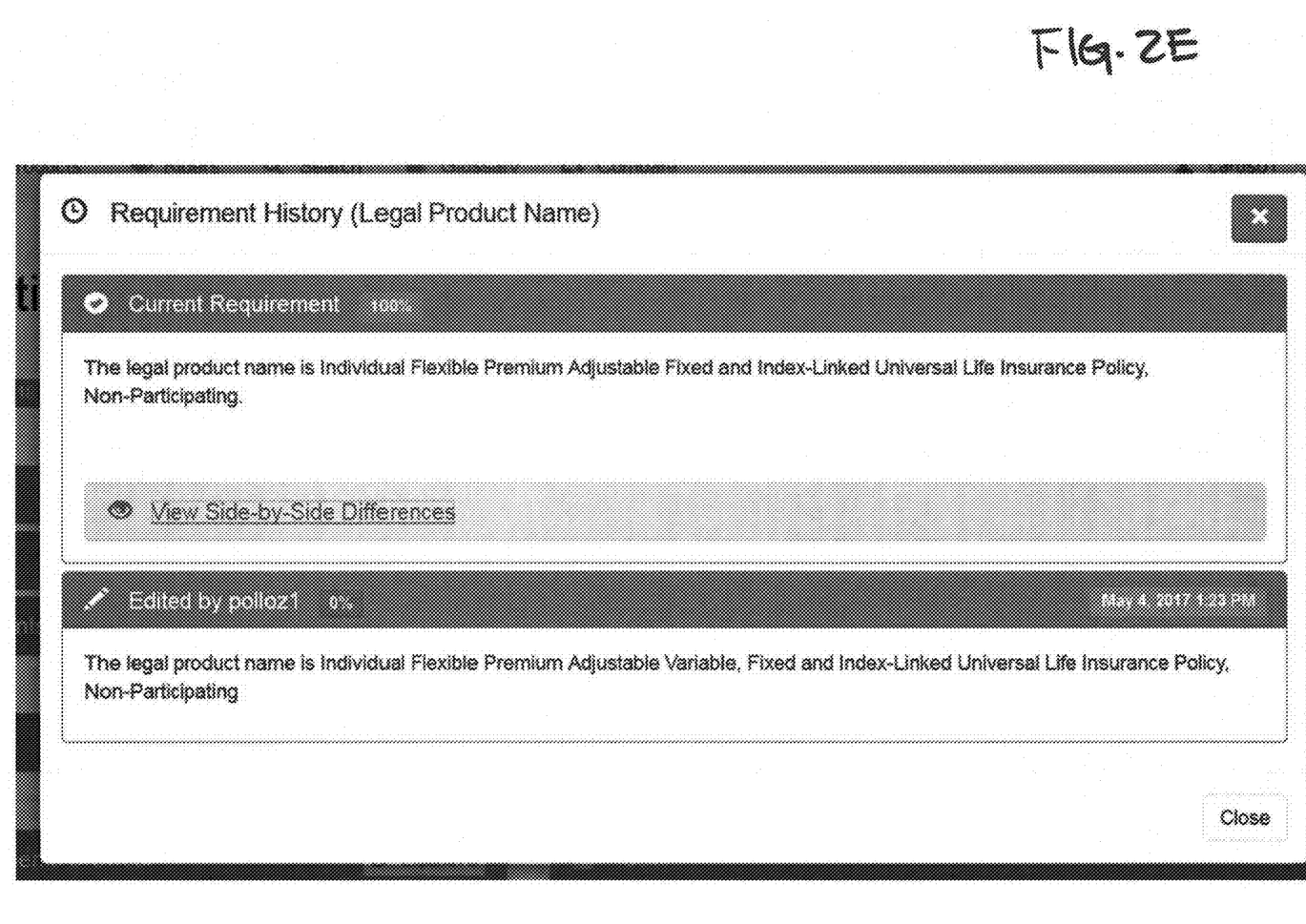

FIG. 2E is an exemplary user interface that shows the editing history of a requirement, which allows for an audit trail and traceability.

Figure 2F:
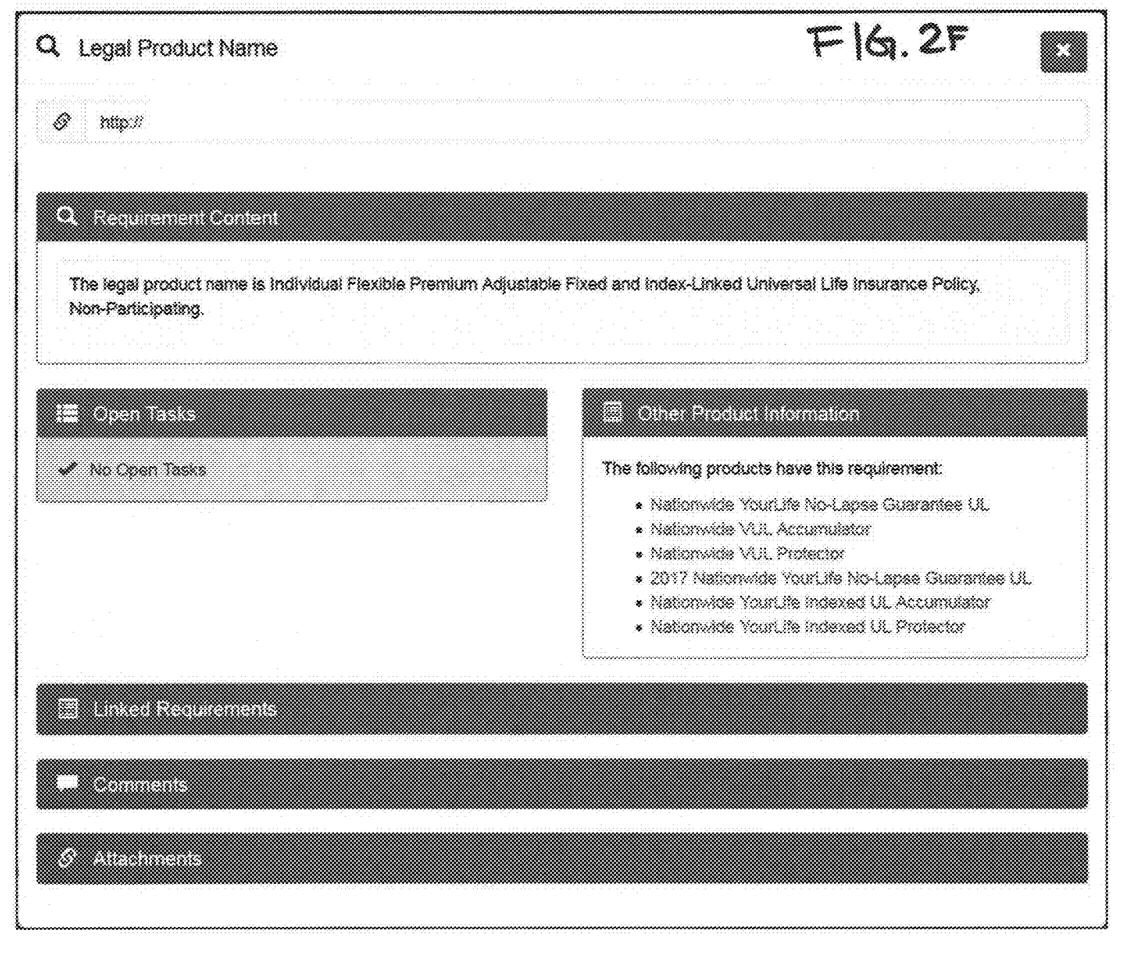

FIG. 2F is an exemplary user interface that shows the detail of a requirement that has been added to a product, including outstanding tasks associated with completion of the requirement.

Figure 2H:
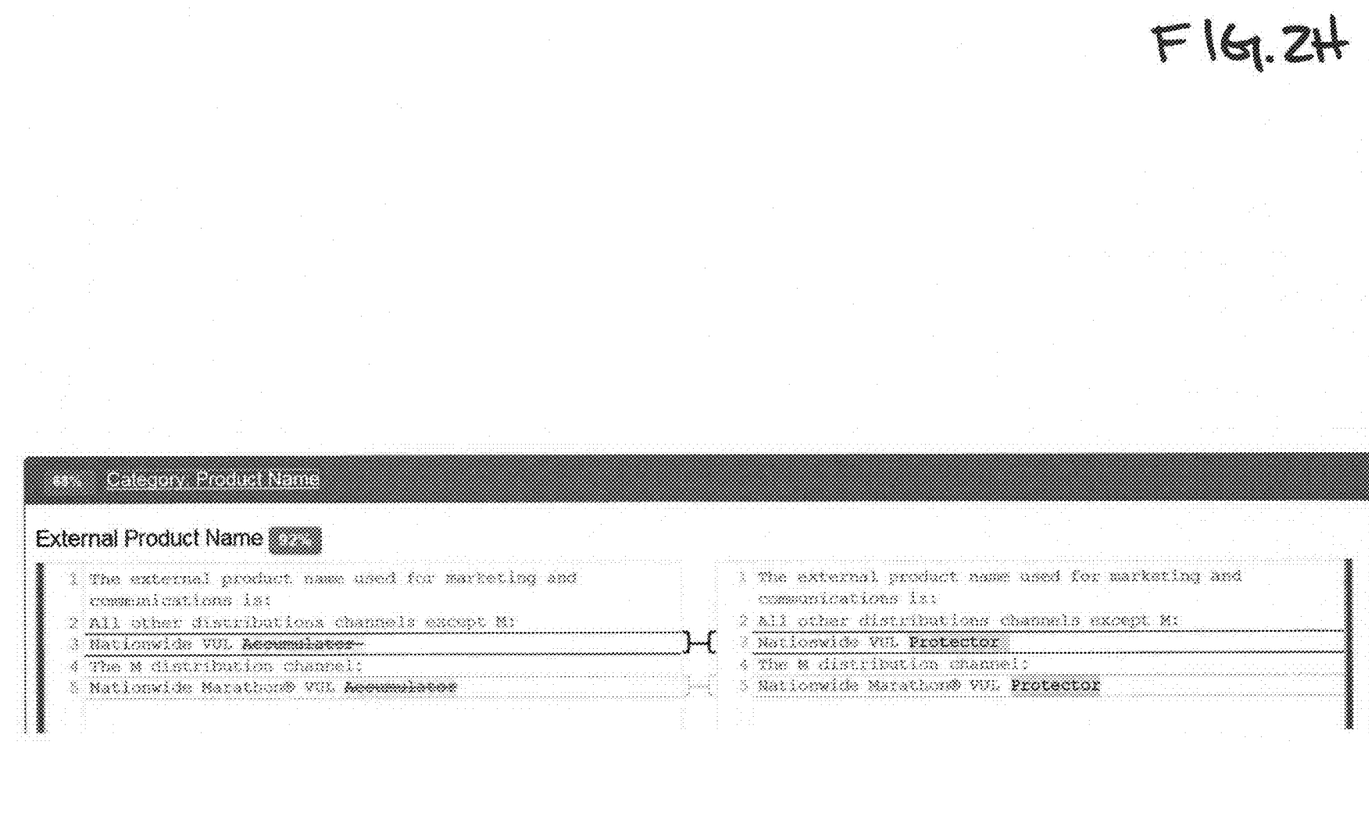

FIG. 2G is an exemplary user interface that allows for comparisons between products. In this example, the VIM Accumulator is compared to the VUL Protector. The interface shows the requirements common to both, with the percentages indicating how similar that requirement is between the products. This allows an end user to make a determination as to whether one product (e.g., VUL Accumulator) is similar enough to another product (e.g., VUL Protector) such that the code for the ono product can be used for the other product, making changes as indicated by the differences in the requirements. FIG. 2H is an exemplary user interface that shows specific information about how the requirements differ between products.

The invention may be carried out by a computer system configured in a variety of different ways, including as a web application in the preferred embodiment. Exemplary computer systems are described in the following.

In some embodiments, the methods are earned out by a system that employs a client/server architecture. Such exemplary embodiments are described as follows with reference to FIG. 3. The data that may be used as an input to the system, and the outputs to the system, may be stored in one or more databases 310. Database server(s) 302 may include a database services management application 303 that manages storage and retrieval of data from the database(s) 310. The databases 310 may be relational databases; however, other data organizational structure may be used without departing from the scope of the present invention.

Figure 3:
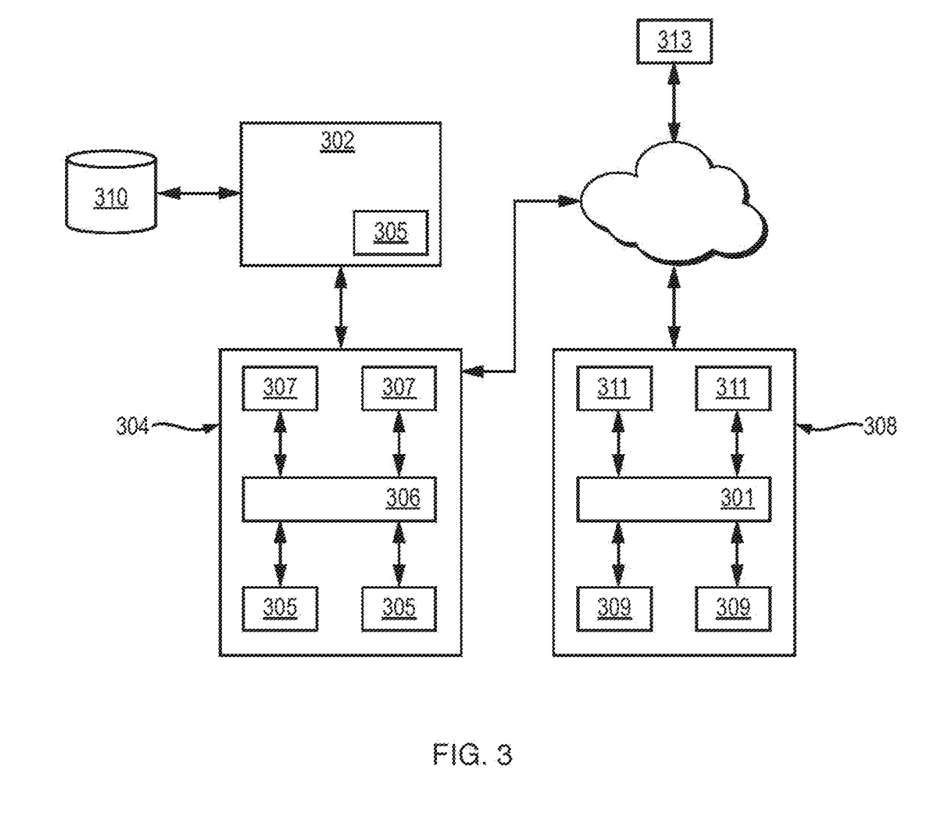
FIG. 3 is an exemplary system that may be used to implement embodiments of the present invention.

One or more application server(s) 304 are in communication with the database server 302. The application server 304 communicates requests for data to the database server 302. The database server 302 retrieves the requested data. The application server 304 may also send data to the database server 302 for storage in the database(s) 301. The application server 304 comprises one or more processors 305, non-transitory computer readable storage media 307 that store programs (computer readable instructions) for execution by the processor(s) (e.g., to perform the calculations described herein), and an interface 306 between the processor(s) 305 and computer readable storage media 307. The application server 304 may store the computer programs referred to herein.

To the extent data and information is communicated over the Internet or an Intranet, one or more Internet/Intranet servers 308 may be employed. The Internet/Intranet server 308 also comprises one or more processors 309, computer readable storage media 311 that store programs (computer readable instructions) for execution by the processor(s), and an interface 301 between the processor(s) 309 and computer readable storage media 311. The Internet/Intranet server 308 is employed to deliver content that can be accessed through the communications network 312, e.g., by an end user employing computing device 313. When data is requested through an application, such as an Internet browser, the Internet/Intranet server 308 receives and processes the request. The Internet/Intranet server 308 sends the data or application requested along with user interface instructions for displaying a user interface on device 313.

The computers referenced herein are specially programmed to perform the functionality described herein.

The non-transitory computer readable storage media (e.g., 307 or 311) that store the programs (i.e., software modules comprising computer readable instructions) may include volatile and non-volatile, removable and non-removable media implemented in any method or technology for storage of information such as computer-readable instructions, data structures, program modules, or other data. Computer readable storage media may include, but is not limited to, RAM, ROM, Erasable Programmable ROM (EPROM), Electrically Erasable Programmable ROM (EEPROM), flash memory or other solid state memory technology, CD-ROM, digital versatile disks (DVD), or other optical storage, magnetic cassettes, magnetic tape, magnetic disk storage or other magnetic storage devices, or any other medium which can be used to store the desired information and which can be accessed by the computer system and processed.

Figure 4:
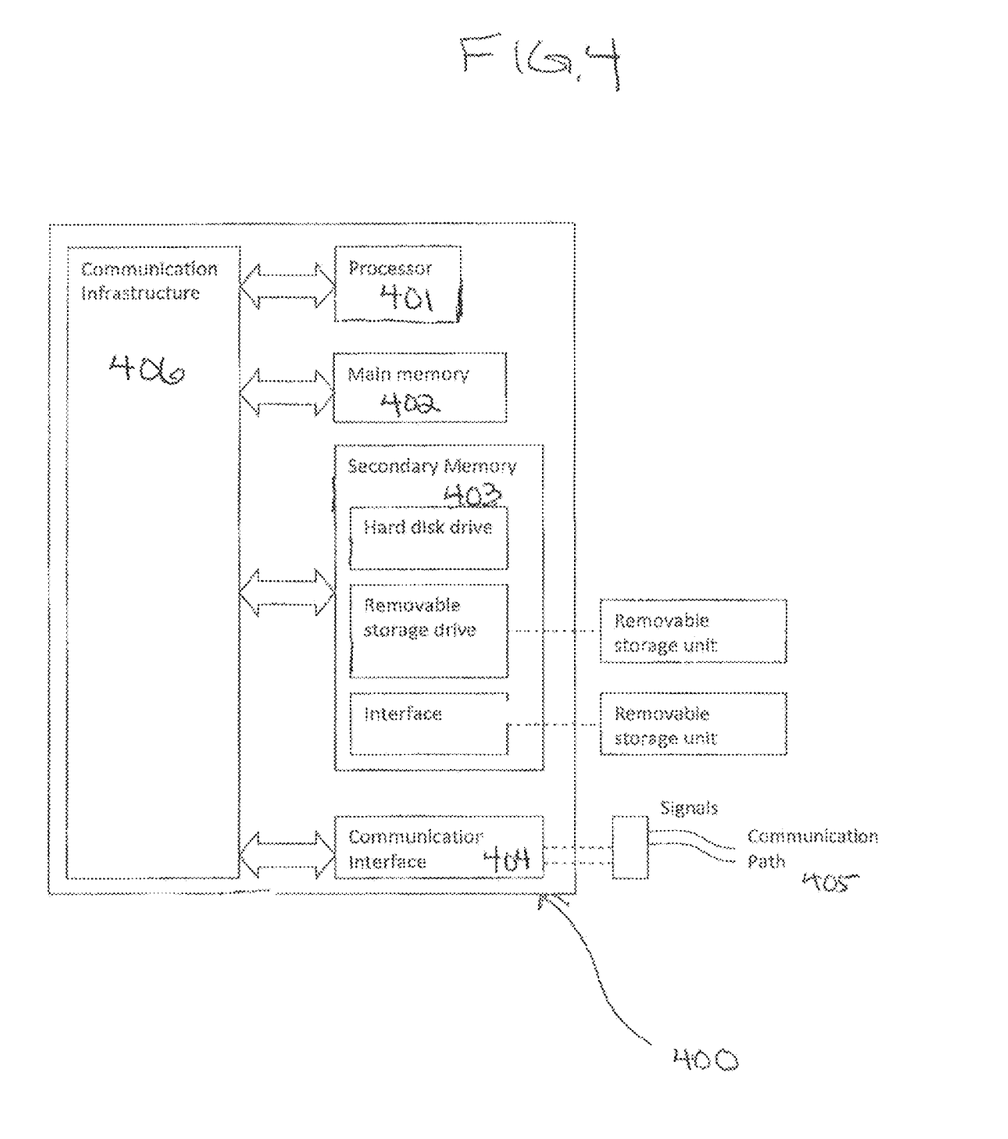
FIG. 4 is an exemplary system that may be used to implement embodiments of the present invention.

With reference to FIG. 4, computer system 400 comprises hardware, including a computer processor, as described more fully herein, that is specifically programmed using code (i.e., computer readable instructions stored in a non-transitory computer readable medium) to carry out the functionality described herein.

Computer system 400 includes one or more processors 401. Processor 401 may be any type of processor, including but not limited to a special purpose or general purpose digital signal processor. Processor 401 may be connected to a communication infrastructure 406 (for example, a bus or network).

Computer system 400 also includes one or more memories 402, 403. Memory 402 may be random access memory (RAM). Memory 403 may include, for example, a hard disk drive and/or a removable storage drive, such as a floppy disk drive, a magnetic tape drive, or an optical disk drive, by way of example. Removable storage drive reads from and/or writes to a removable storage unit (e.g., a floppy disk, magnetic tape, optical disk, by way of example) as will be known to those skilled in the art. As will be understood by those skilled in the art, removable storage unit includes a computer usable storage medium having stored therein computer software and/or data.

In alternative implementations, memory 403 may include other similar means for allowing computer programs or other instructions to be loaded into computer system 400. Such means may include, for example, a removable storage unit and an interface. Examples of such means may include a removable memory chip (such as an EPROM, or PROM, or flash memory) and associated socket, and other removable storage units and interfaces which allow software and data to be, transferred from removable storage unit to computer system 400. Alternatively, the program may be executed and/or the data accessed from the removable storage unit, using the processor 401 of the computer system 400.

Computer system 401 may also include a communication interface 404. Communication interface 404 allows software and data to be transferred between computer system 400 and external devices. Examples of communication interface 404 may include a modem, a network interface (such as an Ethernet card), and a communication port, by way of example. Software and data transferred via communication interface 404 are in the form of signals, which may be electronic, electromagnetic, optical, or other signals capable of being received by communication interface 404. These signals are provided to communication interface 404 via a communication path 405. Communication path 405 carries signals and may be implemented using wire or cable, fiber optics, a phone line, a wireless link, a cellular phone link, a radio frequency link, or any other suitable communication channel, including a combination of the foregoing exemplary channels.

The terms "non-transitory computer readable medium", "computer program medium" and "computer usable medium" are used generally to refer to media such as removable storage drive, a hard disk installed in hard disk drive, and non-transitory signals, as described herein. These computer program products are means for providing software to computer system 400. However, these terms may also include signals (such as electrical, optical or electromagnetic signals) that embody the computer program disclosed herein.

Computer programs are stored in memory 402 and/or memory 403. Computer programs may also be received via communication interface 404. Such computer programs, when executed, enable computer system 400 to implement the present invention as discussed herein. Accordingly, such computer programs represent controllers of computer system 400. Where the invention is implemented using software, the software may be stored in a computer program product and loaded into computer system 400 using removable storage drive, hard disk drive, or communication interface 404, to provide some examples.

The technology of the present invention allows for quickly performing full product comparisons, including an output of percentage text similarity. Further, the present invention results in more efficient database usage technology due to shared requirements across products. Less database space is being used and, thus, there is an increased efficiency in the ability to access data, making comparisons a much easier task than whole-text to whole-text comparison. Data elements are isolated and compared as elements, instead of viewing entire, documents as a whole, which results in computational efficiencies.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention and features of the disclosed embodiments may he combined. Unless specifically set forth herein, the terms "a", "an" and "the" are not limited to One element but instead should be read as meaning "at least one".

It is to be understood that at least some of the figures and descriptions of the invention have been simplified to focus on elements that are relevant for a clear understanding of the invention, while eliminating, for purposes of clarity, other elements that those of ordinary skill in the art will appreciate may also comprise a portion of the invention. However, because such elements are well known in the art, and because they do not necessarily facilitate a better understanding of the invention, a description of such elements is not provided herein.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A system comprising:
   at least one processor;
   a plurality of electronic templates comprising a plurality of fields displayed on a graphical user interface, each electronic template associated with a product type,
      wherein the plurality of fields comprise software requirement type fields associated with a software requirement content field;
   a first database storing, via the at least one processor, requirement data received via the software requirement type fields and the software requirement content fields;
   a linking module configured to link, via the at least one processor, the requirement data with product type data associated with the product type;
   an isolating module configured to isolate a subset of the requirement data and store the isolated subset in a second database, via the at least one processor, based on the linking between the product type data and the requirement data, the isolated subset consisting of similar requirement data including a first requirement data associated with the product type data and a second requirement data associated with the product type data; and a comparison module configured to generate, on the graphical user interface, via the at least one processor, a comparison of the software requirement content field of one electronic template associated with the first requirement data with a corresponding software requirement content field of one other electronic template associated with the second requirement data, the comparison module configured to display a confidence indicia based on the comparison, wherein the confidence indicia represents a degree of difference between one electronic template and the other electronic template, wherein the comparison module is configured to generate a percentage value based on the comparison of the software requirement content fields, the percentage value being associated with the difference between the software requirement field of the least one electronic template and the corresponding software requirement content of the one other electronic template.

2. The system of claim 1, wherein the electronic template is associated with a first product and is created by copying an electronic template associated with a second product that is a same product type as the first product.

3. The system of claim 2, wherein both the software requirement type fields and the software requirement content fields of the second product are copied.

4. The system of claim 2, wherein only the software requirement type fields of the second product are copied.

5. The system of claim 1 wherein the software requirement content field may be linked to one or more product types.

6. The system of claim 1, wherein a percentage value is displayed in the electronic template in association with the comparison of the software requirement content fields.

7. The system of claim 1, wherein a percentage value is displayed to an end user via the graphical user interface.

8. The system of claim 1, wherein the comparison module is further configured to display at least one difference between the software requirement content field of one electronic template and the corresponding software requirement content field of one other electronic template.

9. The system of claim 1 further comprising:

a tracking module configured to track, on the graphical user interface, via the at least processor, at least one difference between the software content field of one electronic template and the corresponding software requirement content field of the one other electronic template, where the one electronic template and the other electronic template are both associated with a same product type, wherein the tracking module is configured to display the at least one difference.

10. A computerized method comprising:

creating a plurality of electronic templates comprising a plurality of fields-displayed on a graphical user interface, each electronic template associated with a product type,
  wherein the plurality of fields comprise software requirement type fields associated with a software requirement content field;

storing in a first database requirement data received in the software requirement type fields and the software requirement content fields;

linking, using a linking module, the requirement data with product type data associated with the product type; and isolating a subset of the requirement data and storing the isolated subset in a second database, using an isolating module, based on the linking between the product type data and the requirement data, the isolated subset consisting of similar requirement data including a first requirement data associated with the product type data and a second requirement data associated with the product type data;

generating on the graphical user interface, using a comparison module, a comparison of the software requirement content field of one electronic template associated with the first requirement data with a corresponding software requirement content field of one other electronic template associated with the second requirement data;

displaying, on the graphical user interface, a confidence indicia based on the comparison, wherein the confidence indicia represents a degree of difference between one electronic template and the other electronic template; and generating, using the comparison module, a percentage value based on the comparison of the software requirement content fields, the percentage value being associated with the difference between the software requirement field of the least one electronic template and the corresponding software requirement content of the one other electronic template.

11. The computerized method of claim 10, wherein the electronic template is associated with a first product and is created by copying an electronic template associated with a second product that is a same product type as the first product.

12. The computerized method of claim 11, wherein both the software requirement type fields and the software requirement content fields of the second product are copied.

13. The computerized method of claim 11, wherein only the software requirement type fields of the second product are copied.

* * * * *